United States Patent
Valembois et al.

(10) Patent No.: US 11,680,868 B2
(45) Date of Patent: Jun. 20, 2023

(54) METHOD FOR WARNING OF RISK OF RUPTURE OR DEFORMATION OF A PART MADE OF A COMPOSITE MATERIAL, AND PART PRODUCED

(71) Applicant: CONSEIL ET TECHNIQUE, Lauzerville (FR)

(72) Inventors: Guy Valembois, Lauzerville (FR); Bertrand Florentz, Paucourt (FR); Nicolas-Jean Fischer, Montargis (FR)

(73) Assignee: CONSEIL ET TECHNIQUE, Lauzerville (FR)

( * ) Notice: Subject to any disclaimer, the term of this patent is extended or adjusted under 35 U.S.C. 154(b) by 292 days.

(21) Appl. No.: 17/259,178

(22) PCT Filed: Jun. 4, 2019

(86) PCT No.: PCT/IB2019/054605
§ 371 (c)(1),
(2) Date: Jan. 10, 2021

(87) PCT Pub. No.: WO2019/234601
PCT Pub. Date: Dec. 12, 2019

(65) Prior Publication Data
US 2021/0156751 A1    May 27, 2021

(30) Foreign Application Priority Data

Jun. 4, 2018  (FR) ........................................ 1854834
Jun. 4, 2018  (FR) ........................................ 1854837

(51) Int. Cl.
*G01L 1/12*  (2006.01)
*G01M 5/00*  (2006.01)
(Continued)

(52) U.S. Cl.
CPC ............ *G01M 5/0041* (2013.01); *B29C 70/30* (2013.01); *B29C 70/70* (2013.01); *G01L 1/127* (2013.01); *G01L 1/242* (2013.01)

(58) Field of Classification Search
CPC ... G01M 5/0041; G01M 5/0033; B29C 70/30; B29C 70/70; B29C 70/06; G01L 1/127; G01L 1/242; B29L 2031/3002
See application file for complete search history.

(56) References Cited

U.S. PATENT DOCUMENTS 7,924,031 B2 * 4/2011 Watkins, Jr. ........... G01N 27/20
                                                    324/543
8,366,045 B2 * 2/2013 Goncalves De Oliveira ...............
                                                    G01M 5/0033
                                                    244/129.1
(Continued)

FOREIGN PATENT DOCUMENTS

DE    102007032351 A1    1/2009
DE    102008058882 A1    6/2010
(Continued)

*Primary Examiner* — Freddie Kirkland, III
(74) *Attorney, Agent, or Firm* — Craft Chu PLLC; Andrew W. Chu

(57) ABSTRACT

The method for warning of risk of rupture or deformation of a part made of a composite material when it is subjected to a force relates to a part including a fibre-reinforced thermoplastic or thermohardenable matrix. The method includes arranging the fibers in a lattice structure produced by winding fibers to form bars that join together or intersect at nodes. The method includes designing at least one bar of the lattice and/or integrating, into the part, at least one additional bar with a determined location and tensile strength and associating, with the at least one bar, inside the part, a sensor to detect the rupture thereof. The method further includes associating, with the sensor, an emitter, outside the part, for a signal relating to the rupture.

15 Claims, 2 Drawing Sheets

(51) Int. Cl.
  *B29C 70/30*   (2006.01)
  *B29C 70/70*   (2006.01)
  *G01L 1/24*    (2006.01)

(56) References Cited

U.S. PATENT DOCUMENTS

| | | | | |
|---|---|---|---|---|
| 8,534,133 | B2* | 9/2013 | Hucker | H01Q 1/28 73/777 |
| 8,684,595 | B2* | 4/2014 | Wardle | B82Y 15/00 977/932 |
| 10,875,661 | B2* | 12/2020 | Linde | G01L 1/16 |
| 2005/0245338 | A1* | 11/2005 | Eichhorn | D07B 1/145 474/252 |
| 2007/0037462 | A1 | 2/2007 | Allen et al. | |
| 2007/0166831 | A1* | 7/2007 | Watkins, Jr. | G01N 27/20 436/149 |
| 2009/0121121 | A1* | 5/2009 | Dunleavy | G01M 5/0033 250/227.14 |
| 2010/0308163 | A1* | 12/2010 | Goncalves De Oliveira | G01M 5/0033 703/1 |
| 2011/0142091 | A1* | 6/2011 | Wardle | G01N 25/72 977/773 |
| 2011/1142091 | | 6/2011 | Wardle | |

FOREIGN PATENT DOCUMENTS

| | | |
|---|---|---|
| EP | 2112374 A1 | 10/2009 |
| EP | 2500706 A1 | 9/2012 |
| FR | 2865539 A1 | 7/2005 |
| FR | 2980574 A1 | 3/2013 |
| JP | H0334805 U | 4/1991 |
| WO | 2004035913 A1 | 4/2004 |
| WO | 2007003883 A1 | 1/2007 |
| WO | 2009044191 A2 | 4/2009 |

* cited by examiner

METHOD FOR WARNING OF RISK OF RUPTURE OR DEFORMATION OF A PART MADE OF A COMPOSITE MATERIAL, AND PART PRODUCED

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention is related to the field of the structural parts made of composite material, comprising a fiber-reinforced thermoplastic or thermosetting matrix, such as fittings for example.

It relates to a process for warning of a risk of breakage or deformation of such a structural part depending on its use, as well as to a composite material part including a system for warning of a risk of breakage or deformation.

It should be noted that the term "fiber" is understood to mean all the forms in which the reinforcing fibers can be present, and namely, but non-restrictively, strands, ribbons or cords of reinforcing fibers.

2. Description of Related Art Including Information Disclosed Under 37 CFR 1.97 and 37 CFR 1.98

Composite parts used as structural parts have the drawback of a risk of breakage that cannot be prevented because they deform very little before breaking, which today imposes an important oversizing of these parts so that they only break beyond an ultimate force, much greater than the maximum operating forces. In addition, since they can occasionally be damaged without this being visible, they are also oversized in order to withstand ultimate operating loads and fatigue, even after damage.

However, it would be preferable, in terms of weight and economically, to make the damage to these composite parts more legible, by being able to preventively detect a risk of breakage.

From US 2007/037462, FR 2 865 539, FR 2 980 574, DE 10 2007 032351, WO 2007/003883, WO 2009/044191, or also JP 3 344805, EP 2 500 706 and EP 2 112 374 are also known objects, which incorporate elements having a calibrated fragility associated with sensor means, with the drawbacks that they are not part of the structural elements, at best they connect structural elements, so that they may give way for reasons other than the stress from the strength of the object, for example a shock.

BRIEF SUMMARY OF THE INVENTION

The object of the present invention is therefore to provide a method for manufacturing a composite structural part, as well as the composite structural part so obtained, permitting to prevent a risk of breakage by integrating in the elements means for warning of a risk, which create the resistance to a load.

According to the invention, the method for warning of a risk of breakage or deformation of a structural part made of composite material when it is subjected to a force, according to the invention, wherein said part consists of a fiber-reinforced thermoplastic or thermosetting matrix, is characterized in that it consists in:

arranging said fibers into a mesh structure obtained by winding fibers, whether or not impregnated with resin, onto studs or the like, so as to stretch the fibers between studs in order to form bars joining or intersecting in nodes, wherein said bars are oriented so as to be subjected to a tensile or compression stress, configuring at least one bar of said mesh and/or integrating into said part at least one additional bar created from additional nodes and/or one or more nodes of said mesh, the location and the resistance to breaking of which are determined so that, on the one hand, at its location, its breaking is not detrimental to the integrity in use of said mesh and hence of said part, and on the other hand, that said resistance to breaking is calibrated to have a value higher than the one that allows to withstand an optimal stress in use of said part, while being smaller than that of maximum stress of said part, associating with said at least one bar, inside said part, a sensor means designed capable of detecting its breakage, associating with said sensor means, means for transmitting, outside said part, a signal relating to the breakage.

Thus, the present invention uses the properties of a mesh structure to create inside same a secondary mesh, stretched between the nodes of the main mesh, and at least one of the bars of which is dedicated to measuring.

According to an additional feature of the method according to the invention, the strength of the at least one additional bar is calibrated, by reducing its section with respect to that of the other bars, or by using a material that is less resistant than the one used for the other bars, or by creating on said bar an accident in shape capable of causing over-stress, or by under-dimensioning an additional node.

According to another additional feature of the method according to the invention, second sensor means for detecting the breakage of one of said elements associated with elements of said structure are incorporated into the mesh structure.

Under the action of an important stress, it is possible, in addition to the secondary mesh structure dedicated to detection, that the main mesh structure is also deteriorated without this being detectable or visible in the behavior of the composite part or of the object including said part. Therefore, the second sensor means are intended to give the warning with a view to a quick decision-making.

The present invention also relates to a structural part made of composite material including a system for warning of a risk of breakage or deformation when it is subjected to a force, said part made of composite material consisting of a fiber-reinforced thermoplastic or thermosetting matrix, which is characterized in that said fibers are arranged into a mesh structure obtained by winding fibers, whether or not impregnated with resin, on studs or the like, so as to cause the fibers to progress between said studs in order to form bars joining or intersecting at nodes, said bars being oriented so as to be subjected to a tensile or compression stress, said composite part further including at least one bar created from additional nodes and/or one or several nodes of said mesh, the location as well as the resistance to breaking of which are predetermined, so that, on the one hand, its resistance to breaking is calibrated so as to be smaller than the one said part must have and higher than the one that enables same to withstand an optimum stress in use of said part, and on the other hand so that its breaking is not detrimental to the integrity of said part in operation; in that said at least one bar is associated with sensor means designed capable of detecting its breakage; and in that said sensor means is associated with means for transmitting a signal relating to the breaking.

The breakage of the at least one bar dedicated to measuring thus constitutes the first visible damage to the part, the latter maintaining its integrity in nominal operation.

When the part is stressed, the observed breakage of the bar dedicated to measuring is the sign of an overload compared to a nominal load. The passing through this warning threshold may trigger a warning or maintenance action.

The sensor means can be in different forms, and namely, non-restrictively:
- an electrical conductor, or an optical fiber, arranged in the bar dedicated to measuring, which breaks simultaneously with this bar,
- a gauge for measuring the strain due to elongation of the bar, consisting for example of a coil or a conductor, the variation in length of said conductor during the deformation having a direct impact on the strength of the conductor, or any other system permitting to measure a deformation or a stress.

It should be noted that the inclusion into the resin of the mesh can permit to place the sensor close to the bar dedicated to measuring, because, since the resin constituting the matrix having a negligible rigidity is located in front of the one of the composite material constituting the mesh, the local deformation near the bar dedicated to measuring will be similar in the resin to that of the bar.

The means for transmitting a signal can be implemented in different ways, namely, non-restrictively:
- by a wired connection to the sensor, passing through the matrix,
- by a wireless link, through communication electronics directly embedded in the matrix, or printed on the matrix,
- by optical transmission means, using a transparent matrix,
- or by using as sensor a RFID antenna that can be interrogated remotely by an active source capable of detecting its breakage or deformation.

The present invention also relates to a variant of the method for warning of a risk of breakage or deformation of a structural part made of composite material when it is subjected to a force, said part consisting of a fiber-reinforced thermoplastic or thermoset matrix, the process being characterized in that it consists in:
- arranging said fibers into a mesh structure obtained by winding fibers, whether or not impregnated with resin, on studs or the like, so as to stretch the fibers between said studs in order to form bars joining in nodes, said bars being oriented so as to be subjected to a tensile or compression stress,
- designing at least one portion of said part by means of at least one bar of said mesh and/or at least one additional bar created from additional nodes and/or one or more nodes of said mesh, the location and resistance to breaking of which are determined so that, on the one hand, at its location, when the part is subjected to a force reaching or exceeding the nominal force, it is subjected to a force causing it to break, and that its breakage is not prejudicial to the integrity in use of said mesh and hence of said part, on the other hand, that said resistance to breaking is calibrated to have a value higher than the one permitting to withstand an optimum stress in use of said part, while being smaller than that of maximum stress of said part,
- and in that said portion of said part consists of an externally identifiable portion, and which is designed capable of being submitted to a deformation during the breaking of said at least one bar.

Thus, according to this variant, a composite part of the type with a mesh structure is created, which is intended to be subjected to stresses, and which includes a portion, also subjected to said stresses, the mesh structure of which has a resistance to breaking lower than that of the rest of the mesh, but higher than the desired strength of the composite part and lower than the maximum strength of the latter. In addition, this portion of the composite part is identifiable, and the breakage of its structure generates an externally visible modification, such as a deformation.

The deformation of the portion comprising the at least one bar dedicated to measuring thus constitutes the first visible damage to the part, the latter maintaining its integrity in nominal operation.

It is therefore possible to detect, before a risk of breakage of the composite part, that it has been subjected to a force higher than the nominal force.

When the part is stressed, the observed breakage of the bar dedicated to measuring is the sign of an overload compared to a nominal load. The passing through this warning threshold may trigger a preventive or maintenance action.

The present invention also relates to a structural part made of composite material including a means for warning of a risk of breakage or deformation when it is subjected to a force, said part made of composite material consisting of a fiber-reinforced thermoplastic or thermosetting matrix, which is characterized in that said fibers are arranged into a mesh structure obtained by winding fibers, whether or not impregnated with resin, on studs or the like, so as to stretch the fibers between said studs in order to form bars joining in nodes, said bars being oriented so as to be subjected to a tensile or compression stress, in that said part includes at least one portion, which incorporates at least one bar of said mesh and/or at least one additional bar created from additional nodes and/or from one or more nodes of said mesh, referred to as measuring bar, the location and the resistance to breaking of which are determined so that, on the one hand, at its location, when the part is subjected to a force reaching or exceeding the nominal force, it is subjected to a force causing it to break, and that its breaking is not prejudicial to the integrity in use of said mesh and hence of said part, on the other hand, that said resistance to breaking is calibrated to have a value higher than the one permitting to withstand optimum stress in use of said part, while being lower than that of maximum stress of said part, and in that said part consists of an externally identifiable portion, and which is designed capable of being submitted to a deformation upon breaking of said at least one bar.

The lower resistance to breaking of the bar dedicated to measuring can be obtained in different ways such as, non-restrictively, a reduced cross-section compared to those of the other bars of the mesh, an area of embrittlement, providing this bar with an initial shape in order to reduce its resistance to buckling by causing the winding to pass over a particular transit point, for example, integrating into this bar an intermediate coil the strength of which is limited, so that it breaks beyond a determined force exerted on the bar.

According to a particular embodiment, the measuring bar includes stretched fibers and looser fibers, the latter being capable of permitting an increased movement of the part after breaking of said stretched fibers.

According to a particular embodiment of the part made of composite material according to the invention, the portion of said part intended for identifying the breakage includes a primary mesh structure made of a reinforcing fiber having a high modulus and a low rate of elongation at break, said primary structure being associated with a secondary structure, whether or not concurrent with said primary structure and made of reinforcing fibers having a lower modulus, a higher elongation at break and/or a higher tensile stress than the fibers of said primary structure.

The breakage of the primary structure at a force defined by the dimensioning of the part results in a transfer of the force path to the secondary structure. This change in force path results into a change of the overall stiffness, a detectable elongation and/or visible cracks permitting a detection of the damage suffered by the part.

Advantageously, the secondary structure can withstand a greater final load before breaking than the primary structure, so as to ensure the correct operation of the part despite the damage it has suffered.

Thus, for example, in a mesh structure made from HM (high modulus) carbon fibers, the so-called measuring bar or bars are lined with (HR) (high strength) carbon fibers, so as to obtain a reduction in the stiffness after the breakage of the HM fibers, the final maximum force being higher than the first breaking force, using HR fibers having a higher elongation at break and higher allowable values than the HM fibers.

It should be noted that the lining can also be carried out with S-type glass fibers.

BRIEF DESCRIPTION OF THE SEVERAL VIEWS OF THE DRAWINGS

The advantages and features of the methods and of the parts made of composite material, which result therefrom, according to the invention will become more evident from the following description, which refers to the attached drawing, which represents non-restrictive embodiments of same.

DETAILED DESCRIPTION OF THE INVENTION

Figure 1:
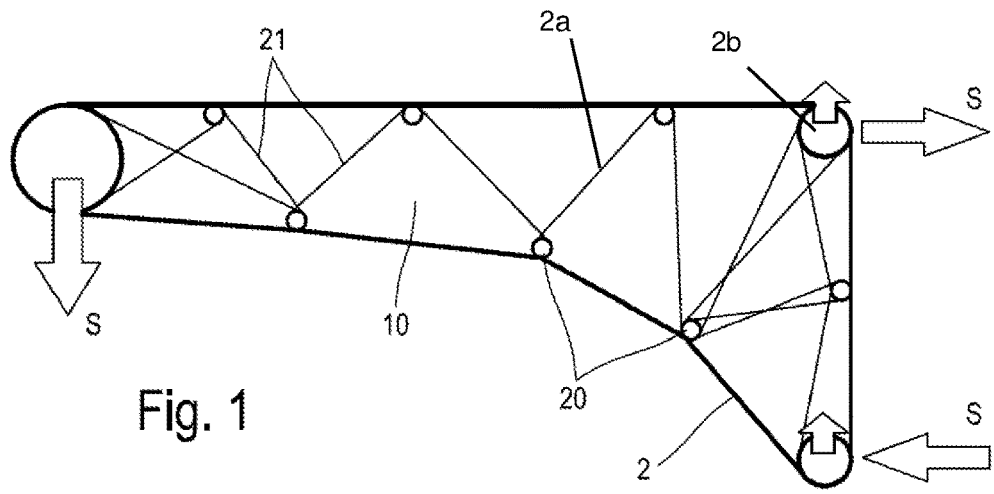
FIG. 1 shows a schematic elevation view of a part made of composite material relating to the field of the invention.

When referring to FIG. 1, there is a part 1 made of composite material according to the invention. This composite part 1 used for illustrating the present invention non-restrictively consists of a pole, suitable for withstanding mechanical stresses S during its use.

The composite part 1 comprises a thermoplastic or thermosetting matrix 10 reinforced with mesh fibers 2a, which are arranged into a mesh structure 2 made up of the filament winding according to a carefully chosen path around coils or pulleys (studs 2b) to form the mesh nodes 20 of the mesh 2, while the rectilinear portions extending between the mesh nodes 20 constitute mesh bars 21. The mesh fibers 2a can be previously coated with a thermoplastic or thermosetting resin.

The preform consisting of the mesh 2 is then integrated into a matrix 10 in order to block the transverse deformations of the mesh fibers 2a, either by soaking in a bath of material constituting the matrix 10, at a temperature that permits to have a sufficient viscosity to cover the mesh 2 of mesh fibers 2a, or by molding in a mold, the filling volume of the part being injected in addition to the mesh 2 previously placed in the mold.

Figure 2:
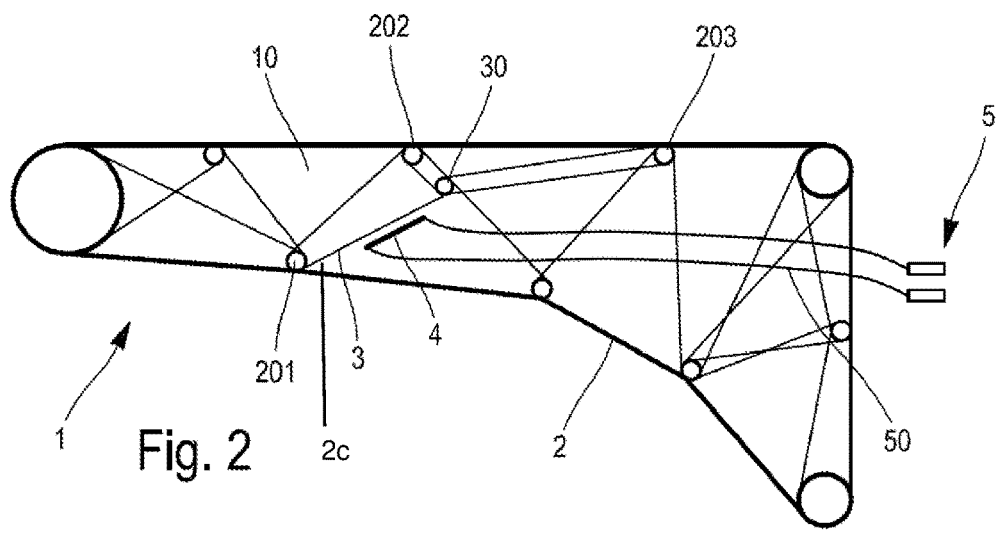
FIG. 2 shows a schematic elevation view of the same part made of composite material equipped with a system for warning of a risk of breakage or deformation according to the invention.

When referring to FIG. 2, according to the invention, the mesh 2 includes an additional warning bar 3 obtained by winding between a mesh node 201 of the mesh 2 and an additional warning node 30, which results, in turn, from a winding with two mesh nodes 202 and 203 of the mesh 2.

The warning bar 3 does not participate in the nominal strength (part strength, part integrity) of the composite part 1. The warning bar 3, having warning bar strength, is subjected to a tensile or compression stress when the composite part 1 is stressed.

The warning bar 3 is configured to provide less resistance than the other mesh bars 21, non-restrictively through a smaller cross-section (mesh bar cross-section, warning bar cross-section), or the use of a less efficient material (mesh bar material efficiency, warning bar material efficiency), or the presence at any location, or of an accident in shape (mesh bar shape strength, warning bar shape strength) causing an over-stressing, or an under-dimensioning of the warning node 30, or a combination of several of these features.

Yet according to the invention, the warning bar 3 is associated with a sensor means 4, intended to be integrated into the matrix 10, and capable of measuring a deformation or a breakage of the warning bar 3 (warning bar breakage). In the embodiment being shown, the sensor means 4 is linked to means 5 for transmitting a signal arranged outside the part 1, and connected to sensor means 4 through a wire link 50.

The sensor means 4 can detect a deformation or a breakage of the warning bar 3, and transmit this information (signal according to the warning bar breakage) to the means 5 for transmitting the signal according to the warning bar breakage.

Figure 3:
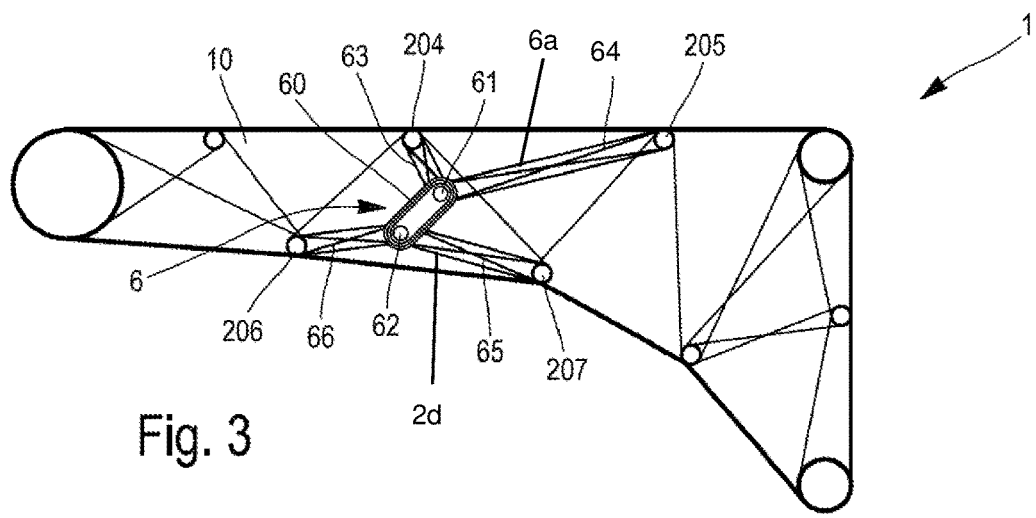
FIG. 3 shows a schematic elevation view of the same part made of composite material equipped with another system for warning of a risk of breakage or deformation according to the invention.

When referring now to FIG. 3, there is a particular embodiment of the warning system according to the invention.

In this embodiment, an additional or warning bar 6 dedicated to warning is made by winding a wire conductor 60 around two additional warning nodes 61 and 62, each of them resulting from the creation of at least two additional secondary warning bars, 63 and 64, and 65 and 66, respectively, by windings with the warning nodes 61 and 62 and mesh nodes 204 and 205, and 206 and 207, respectively.

The warning bar 6 and secondary warning bars 63, 64, 65 and 66, as well as the warning nodes 61 and 62, form a secondary mesh 2*d* stretched internally to the mesh 2 between the mesh nodes 204, 205, 206 and 207, and the warning bar 6 now of the secondary mesh 2*d* constitutes a strain gauge subjected to stresses.

It will be understood that the variation in length of the warning bar 6 and hence of the conductor 60 has a direct impact on the strength of the conductor.

Figure 4:
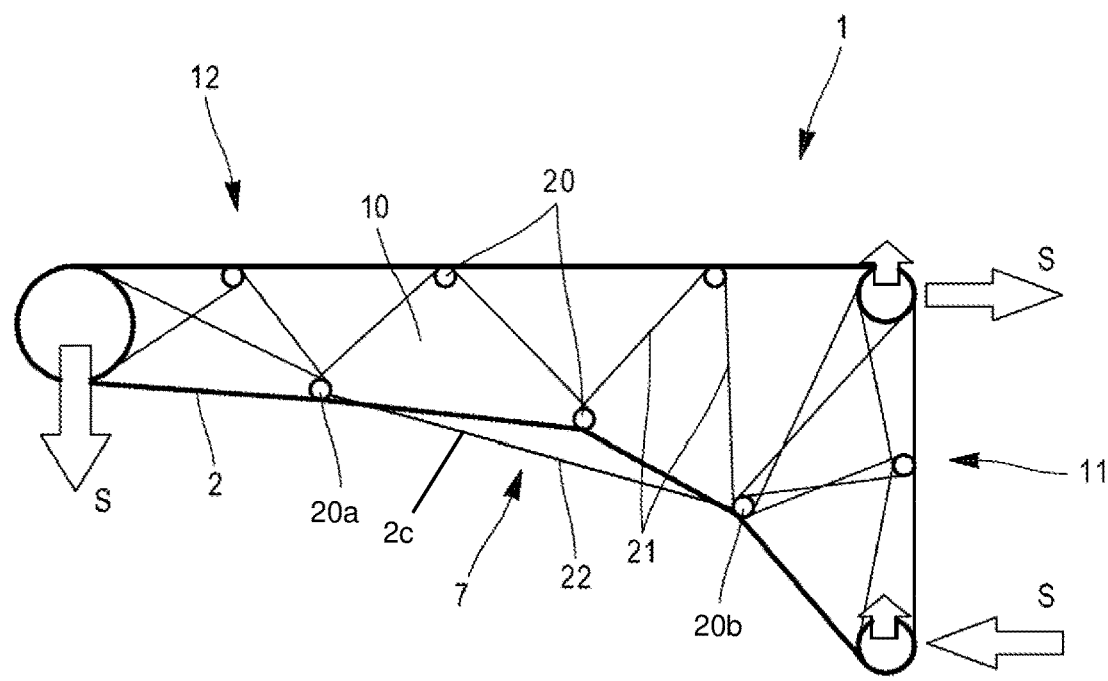
FIG. 4 shows a schematic elevation view of a part made of composite material relating to the field of the invention, equipped with means for warning of a risk of breakage or deformation according to the invention.

When referring now to FIG. 4, the part 1 made of composite material according to the invention, comprises a vertical element 11 and a horizontal element 12.

According to this variant of the invention, the composite part 1 includes an externally identifiable portion 7 comprising a warning bar 22, 23 arching like a stay between a mesh node or vertical element mesh node 20*b* as a warning node of the warning bar 22, 23 of the vertical element 11 and a mesh node or horizontal element mesh node 20*a* as a warning node of the warning bar 22, 23 of the horizontal element 12.

The so-called measuring or warning bar 22 is positioned so as not to participate in the strength of the part 1 when the latter is subjected to a force, so that in the event of breaking, the integrity of the part 1 is intact. It is configured to have a resistance to breaking with a value higher than the one permitting to withstand an optimal stress in use of part 1, while being lower than that of maximum stress of this part 1.

Thus, the breaking of the warning bar 22, leading to the deformation or the breaking of the portion 7 of the part 1, visible from the outside, permits to detect that the part 1 has been or is subjected to a force greater than the required nominal force.

Figure 5:
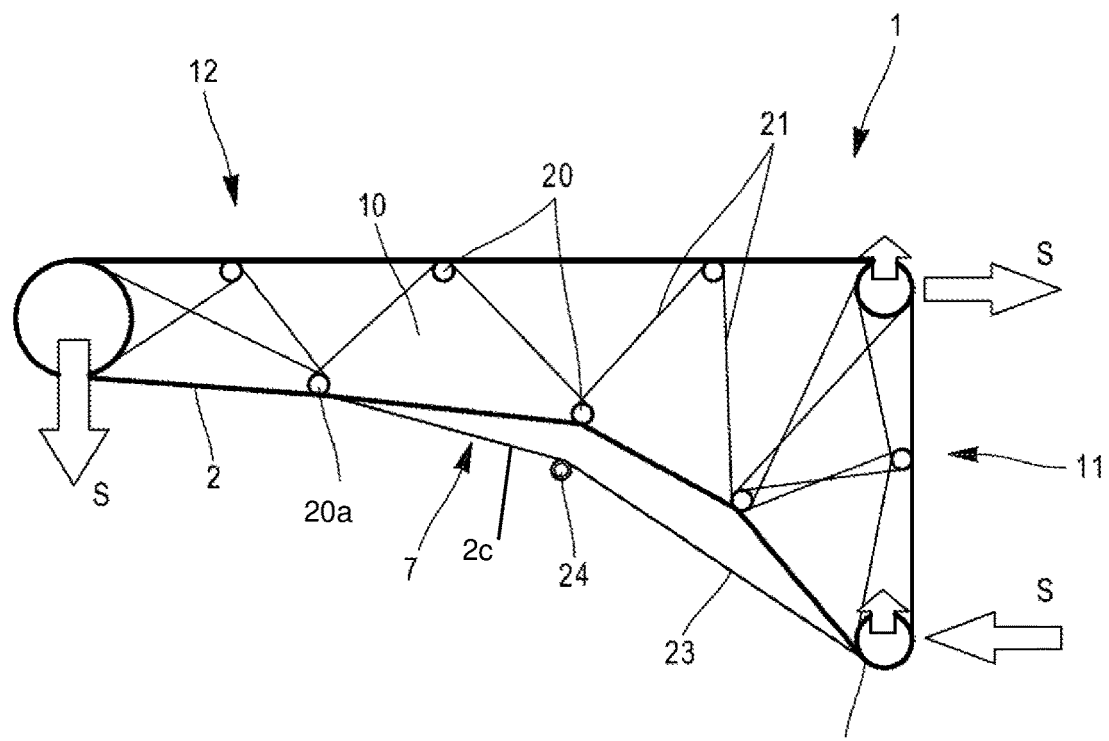
FIG. 5 shows a schematic elevation view of the same part made of composite material equipped with a variant of the means for warning of a risk of breakage or deformation according to the invention.

When referring to FIG. 5, in a variant, in the portion 7 of the part 1 passes a portion of the mesh 2, the warning bar 23 extends between a mesh node or vertical element mesh node 20*a* was a warning node of the warning bar 23 of the vertical element 11 and a mesh node or horizontal element mesh node 20*b* was a warning node of the warning bar 23 of the horizontal element 12 and having, in a middle portion, an area of embrittlement 24 as a winding on a coil 24, the crushing resistance of which, under the action of traction, is calibrated to break when the part 1 is subjected to a force greater than the required nominal force.

We claim:

1. A method for manufacturing a composite material part with a risk of breakage warning signal, the method comprising the steps of:

winding mesh fibers onto a plurality of studs so as to form a mesh,
   wherein said mesh is comprised of a plurality of mesh nodes and a plurality of mesh bars, each mesh bar of said plurality of mesh bars being a rectilinear portion of at least one mesh fiber between adjacent nodes of said plurality of nodes:
      winding warning fibers so as to form a warning bar with a warning node, said warning bar having a warning bar strength to withstand tensile and compression stress;
      associating a sensor means with said warning bar so as to detect a warning bar breakage; and
      associating means for transmitting a signal according to said warning bar breakage with said sensor means; and
      integrating said mesh and said warning bar with a matrix so as to form a composite material part having a part strength to withstand tensile and compression stress determined by said mesh and a part integrity determined by said mesh, said part strength being independent from said warning bar, said part integrity being independent from said warning bar, said warning bar being made integral with the part,
   wherein said warning bar strength is less than said part strength, and
   wherein said signal according to said warning bar breakage is a risk of breakage warning for said composite material part.

2. The method for manufacturing, according to claim 1, wherein each mesh bar of said plurality of mesh bars has a mesh bar cross-section, wherein said warning bar has a warning bar cross-section, and wherein said warning bar cross-section is less than said mesh bar cross-section.

3. The method for manufacturing, according to claim 1,
   wherein the part is comprised of a vertical element and a horizontal element,
   wherein said warning node of said warning bar is comprised of a horizontal element mesh node,
   wherein said warning bar is further comprised of another warning node, said another warning node being comprised of a vertical element mesh node, and
   wherein the step of integrating further comprises the steps of:
      forming an externally identifiable portion of the part with said warning bar, said warning bar breakage corresponding to the portion.

4. The method for manufacturing, according to claim 1, wherein each mesh bar of said plurality of mesh bars has a mesh bar material efficiency according said mesh fibers, wherein said warning bar has a warning bar material efficiency according to said warning fibers, and wherein said warning bar material efficiency is less than said mesh bar material efficiency.

5. The method for manufacturing, according to claim 1, wherein each mesh bar of said plurality of mesh bars has a mesh bar shape strength according to a mesh bar shape, wherein said warning bar has a warning bar shape strength according to a warning bar shape, and wherein said warning bar shape strength is less than said mesh bar shape strength.

6. The method for manufacturing, according to claim 1, wherein said warning bar shape is in improper size for said warning node.

7. A composite material part, comprising:
   a mesh being comprised of a plurality of mesh nodes and a plurality of mesh bars, each mesh bar of said plurality of mesh bars being a rectilinear portion of at least one mesh fiber between adjacent mesh nodes of said plurality of mesh nodes;

a warning bar with a warning node, said warning bar having a warning bar strength to withstand tensile and compression stress;

sensor means associated with said warning bar so as to detect a warning bar breakage; and means for transmitting a signal according to said warning bar breakage, being associated with said sensor means, wherein said mesh and said warning bar are integrated with a matrix so as to have a part strength to withstand tensile and compression stress determined by said mesh and a part integrity determined by said mesh, said part strength being independent from said warning bar, said part integrity being independent from said warning bar, wherein said warning bar strength is less than said part strength, and wherein said signal according to said warning bar breakage is a risk of breakage warning.

8. The part according to claim 7, wherein the sensor means is selected from a group consisting of: an electrical conductor, a bar elongation strain gauge and an optical fiber, arranged relative to said warning bar so as to detect said warning bar breakage.

9. The part, according to claim 7, wherein the means for transmitting the signal is selected from a group consisting of: a wire link passing through said matrix, communication electronics embedded in said matrix, an optical transmission means, and a radio frequency identification (RFID) antenna.

10. The part, according to claim 7, wherein the part is comprised of a vertical element and a horizontal element, wherein said warning node of said warning bar is comprised of a horizontal element mesh node, wherein said warning bar is further comprised of another warning node, said another warning node being comprised of a vertical element mesh node, and wherein said mesh and said warning bar are integrated so as to form an externally identifiable portion, said warning bar breakage corresponding to the portion.

11. The part according to claim 10, wherein each mesh bar of said plurality of mesh bars has a mesh bar cross-section, wherein said warning bar has a warning bar cross-section, and wherein said warning bar cross-section is less than said mesh bar cross-section.

12. The part, according to claim 10, wherein said warning bar is further comprised of an area of embrittlement.

13. The part, according to claim 12, wherein said area of embrittlement is comprised of a winding on a coil.

14. The part, according to claim 10, wherein said warning fibers are stretched and looser than said mesh fibers said portion being movable, after breaking of said warning fibers.

15. The part, according to claim 7, further comprising:

a secondary warning bar being comprised of said warning node and a secondary mesh node and integrated with said warning bar so as to form a secondary mesh connected to said mesh.

\* \* \* \* \*